United States Patent [19]
Kummer et al.

[11] 3,872,121
[45] Mar. 18, 1975

[54] 2-(PHENYL-AMINO-2-IMIDAZOLINES AND SALTS THEREOF

[75] Inventors: Werner Kummer; Helmut Stähle; Herbert Köppe, all of Ingelheim am Rhein; Wolfgang Hoefke, Budenheim, all of Germany

[73] Assignee: Boehringer Ingelheim G.m.b.H., Ingelheim am Rhein, Germany

[22] Filed: Apr. 30, 1973

[21] Appl. No.: 355,412

[30] Foreign Application Priority Data
Apr. 28, 1972 Germany............................ 2220906

[52] U.S. Cl.... 260/256.4 N, 260/256.4 C, 260/296 R, 260/309.6, 424/251, 424/263, 424/273
[51] Int. Cl............................................. C07d 57/00
[58] Field of Search ............. 260/256.4 C, 256.4 N

[56] References Cited
UNITED STATES PATENTS
2,719,846   10/1955   Burtner............................ 260/256.4

Primary Examiner—James A. Patten
Attorney, Agent, or Firm—Hammond & Littell

[57] ABSTRACT

Compounds of the formula

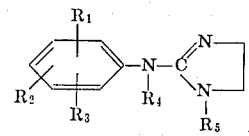

wherein
$R_1$, $R_2$ and $R_3$, which may be identical to or different from each other, are each hydrogen, fluorine, chlorine, bromine, methyl, ethyl, ethoxy, trifluoromethyl or cyano, and
$R_4$ and $R_5$, which must be different, are each hydrogen,

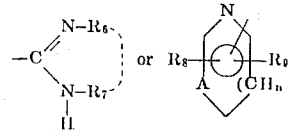

where
$R_6$ and $R_7$, which may be identical to or different from each other, are each hydrogen, methyl or optionally substituted phenyl, or, together with each other, ethylene or propylene,
$R_8$ and $R_9$, which may be identical to or different from each other, are each hydrogen, halogen, methyl or nitro,
A is nitrogen or —CH—, and
$n$ is 0 or 1,
and non-toxic, pharmacologically acceptable acid addition salts thereof; the compounds as well as the salts are useful as hypotensives.

4 Claims, No Drawings

2-(PHENYL-AMINO-2-IMIDAZOLINES AND SALTS THEREOF

This invention relates to novel 2-(phenyl-amino)-2-imidazolines and acid addition salts thereof, as well as to methods of preparing these compounds.

More particularly, the present invention relates to a novel class of 2-(phenyl-amino)-2-imidazolines represented by the formula

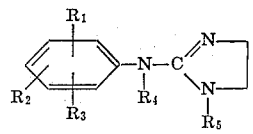

(I)

wherein $R_1$, $R_2$ and $R_3$, which may be identical to or different from each other, are each hydrogen, fluorine, chlorine, bromine, methyl, ethyl ethoxy, trifluoromethyl or cyano, and $R_4$ and $R_5$, which must be different, are each hydrogen,

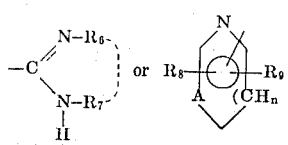

where $R_6$ and $R_7$, which may be identical to or different from each other, are each hydrogen, methyl or optionally substituted phenyl, or, together with each other, ethylene or propylene, $R_8$ and $R_9$, which may be identical to or different from each other, are each hydrogen, halogen, methyl or nitro, A is nitrogen or —CH—, and $n$ is 0 or 1, and non-toxic, pharmacologically acceptable acid addition salts thereof.

The compounds embraced by formula I may be prepared by a number of different methods, among which the following have proved to be most convenient and efficient:

Method A

By reacting a 2-(phenyl-amino)-2-imidazoline of the formula

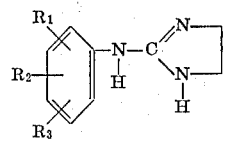

(II)

wherein $R_1$, $R_2$ and $R_3$ have the same meanings as in formula I, with a compound of the formula

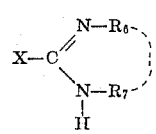

(IIIa)

or

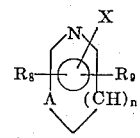

(IIIb)

wherein $R_6$, $R_7$, $R_8$, $R_9$, A and n have the same meanings as in formula I, and X is an easily exchangeable electrophilic substituent, preferably chlorine, bromine, iodine or (alkyl of 1 to 3 carbon atoms)-mercapto.

The reaction is advantageously effected by heating a mixture of the reactants to elevated temperatures, preferably between 50° and 180°C. The presence of a solvent medium during the reaction is not essential, although in some instances, depending upon the reactivity of the reaction partners, it may be advantageous to provide a solvent medium. In some instances, especially when X in compound IIIb is halogen, it is further advantageous to add an acid-binding agent to the reaction mixture.

The substitution may take place either at the bridge nitrogen atom or at the nitrogen atom in the imidazoline ring; which of these two nitrogen atoms has been substituted can be determined by means of NMR-spectroscopy. If the substitution has taken place at the bridge nitrogen atom, the four methyl protons of the imidazoline ring show up as a singulett at about 6.5 ppm ($\tau$-scale); on the other hand, if the substitution has taken place on the ring nitrogen atom of the imidazoline moiety, the NMR-spectrum shows a complex multiplett at 6–7 ppm, instead of a singulett.

When the reaction is performed with a compound of the formula IIIa or IIIb wherein X is alkylmercapto, the substitution takes place exclusively at the imidazoline ring nitrogen atom; that is, the reaction product is a compound of the formula I wherein $R_4$ is hydrogen.

Method B

By reacting a compound of the formula

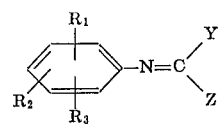

(IV)

wherein $R_1$, $R_2$ and $R_3$ have the same meanings as in formula I, and

Y and Z, which may be identical to or different from each other, are each halogen (preferably chlorine), sulfhydryl, amino, methoxy or (alkyl of 1 to 3 carbon atoms)-mercapto, or a compound of the formula

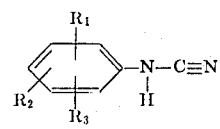

(V)

wherein $R_1$, $R_2$ and $R_3$ have the same meanings as in formula I, with an ethylenediamine of the formula

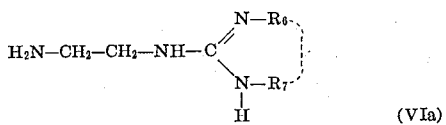

or

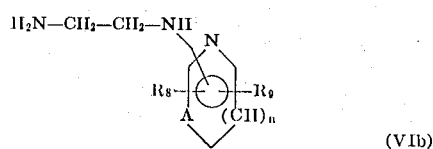

wherein $R_6$, $R_7$, $R_8$, $R_9$, A and n have the meanings previously defined.

The reaction is performed at a temperature between 0° and 180°C, optionally in the presence of a polar, non-polar or polar aprotic solvent medium. If one or both of Y and Z are halogen, it is preferred to perform the reaction in the presence of an acid-binding agent. The reaction time varies between a few minutes and several hours. The optimum reaction conditions in each particular case, which depend primarily upon the reactivity of the reactants, may readily be ascertained by simple preliminary tests.

Method C

A compound of the formula

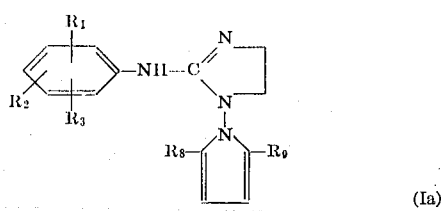

wherein $R_1$, $R_2$, $R_3$, $R_8$ and $R_9$ have the same meanings as in formula I, may also be prepared by reacting a 1-amino-2-anilino-2-imidazoline of the formula

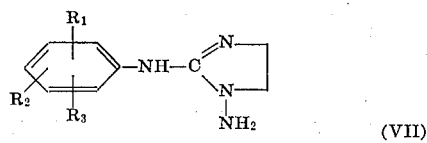

wherein $R_1$, $R_2$ and $R_3$ have the meanings previously defined, with a 1,4-diketone of the formula

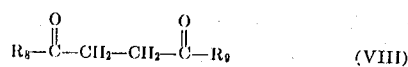

wherein $R_8$ and $R_9$ have the meanings previously defined, or an acetal thereof.

The starting compounds required for methods A to C are either known compounds or may be prepared by known methods.

Thus, most of the phenylamino-imidazolines embraced by formula II are described in Belgian Pat. No. 623,305; they may all be prepared by reacting a correspondingly substituted N-phenyl-S-alkyl-isothiourea or an analogous isothiouronium salt with ethylenediamine.

A compound of the formula V, wherein Y is sulfhydryl and Z is amino (a thiourea), may be obtained, for example, by reacting a substituted aniline with an ammonium thiocyanate pursuant to Houben-Weyl, Methoden der organischen Chemie, Vol. 9, page 887. The resulting thiourea may, in turn, be converted by conventional alkylation procedures into the corresponding N-phenyl-S-alkyl-isothiourea or a salt thereof, i.e. into a compound of the formula IV wherein Y is —S-alkyl and Z is —NH$_2$.

Still other compounds embraced by formula IV are described in German Pat. Nos. 1,094,737 and 1,138,039, British Pat No. 888,646 and French Pat. No. 1,256,873. The methods disclosed in these prior patents may also be used to prepare those compounds of the formula II which have not heretofore been specifically described in the literature.

A compound of the formula IV wherein at least one of Y and Z is other than halogen may, for example, be prepared by reacting a compound of the formula IV wherein Y and Z are both halogen with an aliphatic alcohol, a thiol or ammonia.

A compound of the formula IV wherein Y and Z are both amino (a guanidine) may be prepared by subjecting a phenylcyanamide of the formula V to an addition reaction with ammonia.

A compound of the formula V may, for example, be obtained by splitting off hydrogen sulfide from a correspondingly substituted thiourea.

The compounds embraced by formula VII have not heretofore been described in the literature; they may, however, be prepared by conventional methods, such as by nitrosation of a correspondingly substituted phenylamino-imidazoline, followed by reduction of the 1-nitroso-2-phenylamino-imidazoline with a complex metal hydride, for instance.

The compounds embraced by formula I are organic bases and therefore form acid addition salts with inorganic or organic acids. Examples of non-toxic, pharmacologically acceptable acid addition salts are those formed with hydrochloric acid, hydrobromic acid, hydroiodic acid, hydrofluoric acid, sulfuric acid, phosphoric acid, nitric acid, acetic acid, propionic acid, butyric acid, caproic acid, capric acid, valeric acid, oxalic acid, malonic acid, succinic acid, maleic acid, fumaric acid, lactic acid, tartaric acid, citric acid, malic acid, benzoic acid, p-hydroxy-benzoic acid, p-amino-benzoic acid, phthalic acid, cinnamic acid, salicylic acid, ascorbic acid, methane-sulfonic acid, 8-chlorotheophylline or the like.

The following examples further illustrate the present invention and will enable others skilled in the art to understand it more completely. It should be understood, however, that the invention is not limited solely to the particular examples given below.

EXAMPLE 1

1-(Imidazolin-2-yl)-2-[(2',6'-dichloro-phenyl)-amino]-2-imidazoline and its hydroiodide by method A A mixture consisting of 2.3 gm (0.01 mol) of 2-[(2',6'-dichloro-phenyl)-amino]-2-imidazoline, 2.4 gm (0.01 mol) of 2-methylmercapto-imidazolinium iodide and 10 ml of amyl alcohol was refluxed for two hours. Thereafter, the precipitate which had formed was collected and identified as the hydroiodide of 1-(imidazolin-2-yl)-2-[(2',6'-dichloro-phenyl)-amino]-2-imidazoline. This salt was dissolved in methanol, and the resulting solution was placed into an ice bath and was admixed with cold aqueous 50% potassium hydroxide. The precipitate formed thereby was collected by vacuum filtration, washed with water and dried, yielding 1 gm (33.4% of theory) of the compound of the formula

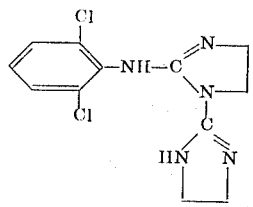

which had a melting point of 248°–250°C. The product was found to be pure in the thin-layer chromatogram (system benzene: dioxane: conc.ammonia: ethanol = 50:40:5:5; potassium iodoplatinate).

EXAMPLE 2

1-(1,4,5,6-Tetrahydro-pyrimidin-2-yl)-2-[(2',6'-dichlorophenyl)-amino]-2-imidazoline by method A A mixture consisting of 6.9 gm (0.03 mol) of 2-[(2',6'-dichloro-phenyl)-amino]-2-imidazoline and 8.5 gm (110%) of 2-methylmercapto-1,4,5,6-tetrahydro-pyrimidinium iodide was heated for 30 minutes at 150°C, while stirring, on an oil bath; during that time methylmercaptan escaped. After cooling, the solidified reaction mixture was dissolved in a little dilute (about 1 N) hydrochloric acid, the resulting solution was purified by extracting it several times with ether, and the ether extracts were discarded. The acid solution was then treated with activated charcoal and subsequently made fractionally alkaline with dilute sodium hydroxide, the solution being fractionally extracted with ether at varying, gradually ascending pH-values. The ethereal extracts which contained the desired reaction product (determination by thin-layer chromatography) were combined, dried over anhydrous calcium sulfate, concentrated and allowed to stand overnight. The crystalline substance which had separated out was collected by vacuum filtration, washed with ether and dried, yielding 2.1 gm (22.4% of theory) of the compound of the formula

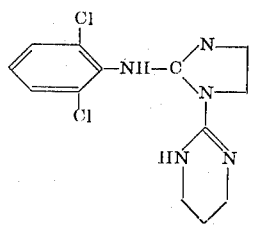

which had a melting point of 243°–245°C. (Thin-layer chromatographic system: Ethyl acetate: isopropanol: con.ammonia = 70:50:20; potassium iodoplatinate).

EXAMPLE 3

Using a procedure analogous to that described in Example 1, 12.0% of theory of 1-(imidazolin-2-yl)-2-[(2'-chloro-6'-methyl-phenyl)-amino]-2-imidazoline, m.p. 226°–228°C, of the formula

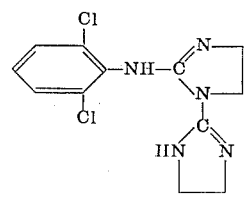

was obtained from 2-[(2'-chloro-6'-methyl-phenyl)-amino]-2-imidazoline and 2-methylmercapto-imidazolinium iodide.

EXAMPLE 4

Using a procedure analogous to that described in Example 1, 30.1% of theory of 1-(imidazolin-2-yl)-2-[(2'-chloro-4'-methyl-phenyl)-amino]-2-imidazoline, m.p. 179°–181°C, of the formula

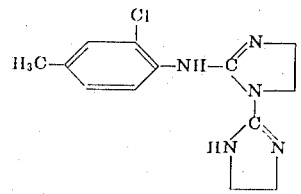

was obtained from 2-[(2'-chloro-4'-methyl-phenyl)-amino]-2-imidazoline and 2-methylmercapto-imidazolinium iodide.

EXAMPLE 5

Using a procedure analogous to that described in Example 1, 32.7% of theory of 1-(imidazolin-2-yl)-2-[(2',4'-dichloro-phenyl)-amino]-2-imidazoline, m.p. 186°–188°C, was obtained from 2-[(2',4'-dichloro-phenyl)-amino]-2-imidazoline and 2-methylmercapto-imidazolinium iodide.

EXAMPLE 6

Using a procedure analogous to that described in Example 1, 33.2% of theory of 1-(imidazolin-2-yl)-2-[(2'-chloro-3'-methyl-phenyl)-amino]-2-imidazoline, m.p. 222°–224°C, was obtained from 2-[(2'-chloro-3'-methyl-phenyl)-amino]-2-imidazoline and 2-methylmercapto-imidazolinium iodide.

EXAMPLE 7

Using a procedure analogous to that described in Example 1, 10.6% of theory of 1-(imidazolin-2-yl)-2-[(2',6'-dichloro-4'-bromo-phenyl)-amino]-2-imidazoline, m.p. 222°–228°C, of the formula

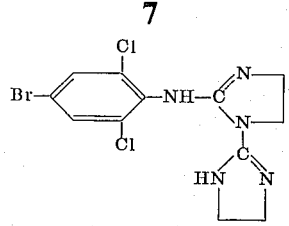

was obtained from 2-[(2',6'-dichloro-4'-bromophenyl)-amino]-2-imidazoline and 2-methylmercapto-imidazolinium iodide.

EXAMPLE 8

Using a procedure analogous to that described in Example 1, 36.6% of theory of 1-(imidazolin-2-yl)-2-[(2'-trifluoromethyl-phenyl)-amino]-2-imidazoline, m.p. 216°–218.5°C, of the formula

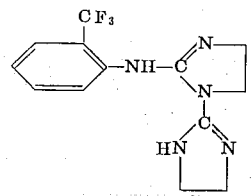

was obtained from 2-[(2'-trifluoromethyl-phenyl)-amino]-2-imidazoline and 2-methylmercapto-imidazolinium iodide.

EXAMPLE 9

Using a procedure analogous to that described in Example 1, 9.8% of theory of 1-(imidazolin-2-yl)-2-[(2',6'-diethyl-phenyl)-amino]-2-imidazoline, m.p. 175°–177°C, of the formula

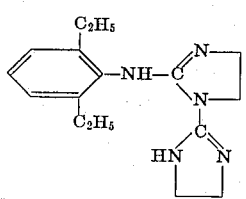

was obtained from 2-[(2',6'-diethyl-phenyl)-amino]-2-imidazoline and 2-methylmercapto-imidazolinium iodide.

EXAMPLE 10

Using a procedure analogous to that described in Example 1, 12.4% of theory of 1-(imidazolin-2-yl)-2-[(2',5'-dimethoxy-phenyl)-amino]-2-imidazoline, m.p. 139°–141°C, of the formula

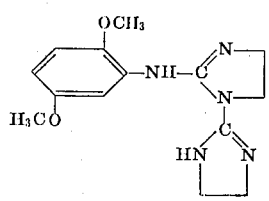

was obtained from 2-[(2',5'-dimethoxy-phenyl)-amino]-2-imidazoline and 2-methylmercapto-imidazolinium iodide.

EXAMPLE 11

Using a procedure analogous to that described in Example 1, 52.7% of theory of 1-(imidazolin-2-yl)-2-[(2',4'-difluoro-phenyl)-amino]-2-imidazoline, m.p. 201°–203°C, of the formula

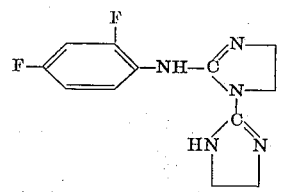

was obtained from 2-[(2',4'-difluoro-phenyl)-amino]-2-imidazoline and 2-methylmercapto-imidazolinium iodide.

EXAMPLE 12

Using a procedure analogous to that described in Example 1, 35.2% of theory of 1-(imidazolin-2-yl)-2-anilino-2-imidazoline, m.p. 180°–182°C, of the formula

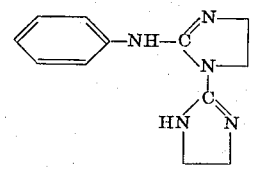

was obtained from 2-amilino-2-imidazoline and 2-methylmercapto-imidazolinium iodide.

EXAMPLE 13

Using a procedure analogous to that described in Example 1, 17.5% of theory of 1-(imidazolin-2-yl)-2-[(4'-cyano-phenyl)-amino]-2-imidazoline, m.p. 230°–232°C, of the formula

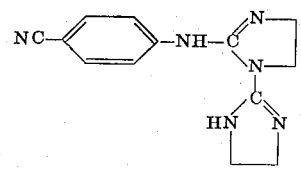

was obtained from 2-[(4'-cyano-phenyl)-amino]-2-imidazoline and 2-methylmercapto-imidazolinium iodide.

EXAMPLE 14

Using a procedure analogous to that described in Example 1, 60.3% of theory of 1-(1,4,5,6-tetrahydropyrimidin-2-yl)-2-[(2',4'-difluoro-phenyl)-amino]-2-imidazoline, m.p. 200°–202°C, was obtained from 2-[(2',6'-difluoro-phenyl)-amino]-2-imidazoline and 2-methylmercapto-imidazolinium iodide.

EXAMPLE 15

Using a procedure analogous to that described in Example 1, 3.3% of theory of 1-(N,N'-dimethyl-amidino)-

2-[(2',6'-dichloro-phenyl)-amino]-2-imidazoline, m.p. 166°–168°C, of the formula

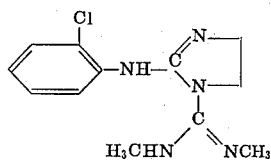

was obtained from 2-[(2',6'-dichloro-phenyl)-amino]-2-imidazoline and methylmercapto-N,N'-dimethylamidinium iodide.

EXAMPLE 16

Using a procedure analogous to that described in Example 2, 41.0% of theory of 1-(1,4,5,6-tetrahydro-pyrimidin-2-yl)-2-[(2',4'-dichloro-phenyl)-amino]-2-imidazoline, m.p. 203°–205.5°C, was obtained from 2-[(2',4'-dichloro-phenyl)-amino]-2-imidazoline and 2-methylmercapto-1,4,5,6-tetrahydro-pyridinium iodide.

EXAMPLE 17

Using a procedure analogous to that described in Example 1, 24.7% of theory of 1-[N-(2',6'-dichloro-phenyl)-amidino]-2-(2'',6''-dichloro-phenyl)-amino]-2-imidazoline, m.p. 211.5°–214.5°C, of the formula

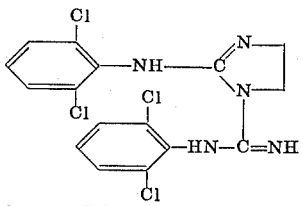

was obtained from 2-[(2',6'-dichloro-phenyl)-amino]-2-imidazoline and methylmercapto-N-(2,6-dichloro-phenyl)-amidinium iodide.

EXAMPLE 18

N-(2,6-Dichloro-phenyl)-N-(4',6'-dimethyl-pyrimidin-2-yl)-N-(imidazolin-2-yl)-amine and its hydrochloride by method A A mixture consisting of 9.2 gm (0.04 mol) of (2,6-dichloro-phenyl)-amino-2-imidazoline and 6 gm (0.042 mol) of 2-chloro-4,6-dimethyl-pyridine was heated on an oil bath, first for 5 hours at 150°C and then for 4 hours at 180°C. Thereafter, the batch was allowed to cool, the solidified mixture was dissolved in 50 ml of methanol, and the resulting solution was admixed with ether until the precipitation of the oily substance caused thereby was complete. The ether phase was now decanted, the residual oil was dissolved in 80 ml of water, and aqueous concentrated ammonia was added to the solution. The precipitate formed thereby was collected by vacuum filtration, thoroughly washed with water and recrystallized from methanol; it was identified to be the free base, N-(2,6-dichloro-phenyl)-N-(4',6'-dimethylpyrimidin-2-yl)-N-(imidazolin-2-yl)-amine.

The base was re-dissolved in methanol, some ethereal hydrochloric acid and then ether were added to the solution, and the precipitate formed thereby was collected and dried in vacuo, yielding 2.7 gm (18.1% of theory) of the hydrochloride of the formula

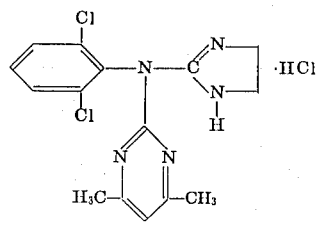

which had a melting point of 248°C.

EXAMPLE 19

N-(2,6-Dichloro-phenyl)-N-(2',4'-dimethyl-pyrimidin-6-yl)-N-(imidazolin-2-yl)-amine and its fumarate by method A A mixture consisting of 9.2 gm (0.04 mol) of 2-[(2',6'-dichloro-phenyl)-amino]-2-imidazoline and 5.7 gm (0.04 mol) of 6 chloro-2,4-dimethyl-pyrimidine was heated for 4 hours at 150°C on an oil bath. Thereafter, the reaction mixture was allowed to cool, the solidified mass was contacted with boiling acetone until everything went into solution, and the resulting solution was admixed with ether. The greasy crystals precipitated thereby were collected, purified with methanol/ether and dissolved in water. The aqueous solution was admixed with dilute sodium hydroxide, and the precipitate formed thereby was collected by vacuum filtration, washed thoroughly with water and dried in vacuo at 20°C, yielding the free base of the formula

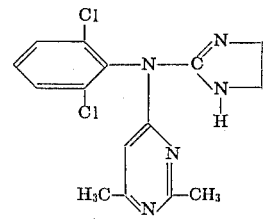

The base was dissolved in acetone, the resulting solution was admixed with methanolic fumaric acid, ether was added to the mixture, and the precipitate formed thereby was collected. 4.2 gm (23.3% of theory) of the fumarate of the base were obtained; the salt had a decomposition point of 222°C.

EXAMPLE 20

N-(2,6-Dichloro-phenyl)-N-(pyrimidin-2-yl)-N-(2-imidazolin-2-yl)-amine hydrobromide by method A A mixture consisting of 9.2 gm (0.04 mol) of 2-[(2',6'-dichloro-phenyl)-amino]-2-imidazoline and 6.7 gm (0.042 mol) of 2-bromo-pyrimidine was melted by heating it at 120°–140°C on an oil bath for 4 hours. Thereafter, the mixture was allowed to cool, the solidified mass was dissolved in ethanol, and the reaction product was fractionally precipitated therefrom with ether. The oily fractions were discarded, but the crystalline fractions were collected and again subjected to the same purification procedure, yielding 1.0 gm (6.5% of theory) of the pure compound of the formula

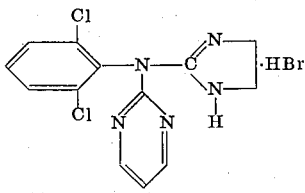

which had a decomposition point of 245°–250°C.

EXAMPLE 21

N-(4-Chloro-phenyl)-N-(4',6'-dimethyl-pyrimidin-2'-yl)-N-(2-imidazolin-2-yl)-amine and its hydrochloride by method A A mixture consisting of 19.5 gm (0.1 mol) of 2-[(4'-chloro-phenyl)-amino]-2-imidazoline and 14.2 gm (0.1 mol) of 2-chloro-4,6-dimethyl-pyrimidine was melted by heating it at 160°–170°C for 5 hours on an oil bath. Thereafter, the reaction mixture was admixed with 100 ml of ethanol, the ethanol was boiled for a short period of time, the small amount of insoluble matter was filtered off, and the filtrate was admixed with dilute sodium hydroxide. The precipitate formed thereby was collected and purified by treatment with ethanol and water, yielding the free base of the formula

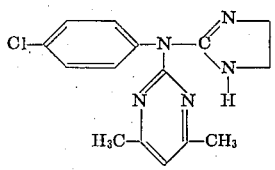

The base was dissolved in ethanol by adding ethereal hydrochloric acid, ether was added to the solution and the precipitate formed thereby was collected, yielding 3.1 gm (9.1% of theory) of the pure hydrochloride of the base, which had a decomposition point of 262°–263°C.

EXAMPLE 22

N-(2,6-Dichloro-phenyl)-N-(3'-nitro-pyridin-6'-yl)-N-(2-imidazolin-2-yl)-amine by method A A mixture consisting of 9.2 gm (0.04 mol) of 2-[(2',6'-dichloro-phenyl)-amino]-2-imidazoline, 6.4 gm (0.04 mol) of 2-chloro-5-nitro-pyridine, 5 ml of triethylamine and 100 ml of isopropanol was refluxed for 16 hours. Thereafter, the reaction solution was concentrated by evaporation until a crystalline precipitate began to form, the concentrate was cooled, and the crystalline precipitate was collected by vacuum filtration, washed with ether and water, and recrystallized from methanol and ether, yielding 8.5 gm (60% of theory) of the golden yellow crystalline compound of the formula

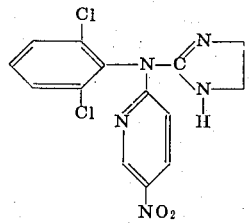

which had a melting point of 185°–187°C.

EXAMPLE 23

1-(2',5'-Dimethyl-pyrrol-1'-yl)-2-(4''-chloro-anilino)-2-imidazoline fumarate by method C A mixture consisting of 9.8 gm (0.03 mol) of 1-amino-2-(4'-chloro-anilino)-2-imidazoline fumarate (m.p. 194°C), 4.33 gm (0.038 mol) of acetonyl acetone and 80 ml of ethanol was refluxed for 6 hours. Thereafter, the hot reaction mixture was filtered, the filter cake was discarded, and the filtrate was allowed to stand overnight at 20°C. Thereafter, the crystalline substance which had separated out was collected and recrystallized from ethanol and methanol, yielding two fractions totaling 5.2 gm (43% of theory of the compound of the formula

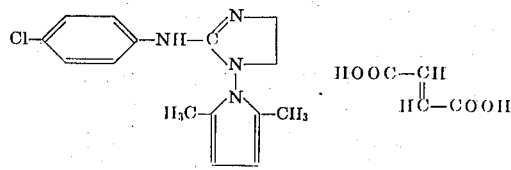

which had a melting point of 193°C.

EXAMPLE 24

Using a procedure analogous to that described in Example 23, 35.6% of theory of 1-(2',5'-dimethyl-pyrrol-1'-yl)-2-(2''-chloro-anilino)-2-imidazoline fumarate, m.p. 190°C, was obtained from 1-amino-2-(2'-chloro-anilino)-2-imidazoline fumarate (m.p. 189°C).

EXAMPLE 25

1-(2',5'-Dimethyl-pyrrol-1'-yl)-2-(2'',4''-dichloro-anilino)-2-imidazoline fumarate by method C A solution of 10.8 gm (0.03 mol) of 1-amino-2-(2',4'-dichloro-anilino)-2-imidazoline fumarate (m.p. 188°C) and 4.33 gm (0.038 mol) of acetonyl acetone in 80 ml of ethanol was refluxed for 4 hours. The reaction solution was allowed to cool and was then diluted with ether (1:4). The crystalline and floccular precipitate formed thereby was collected and discarded. The filtrate was purified with activated charcoal and then concentrated by evaporation until a crystalline substance began to separate out. The concentrate was allowed to cool, and the crystalline precipitate which had formed was collected and recrystallized from ethanol, yielding 5.1 gm (38.8% of theory) of analytically pure 1-(2',5'-dimethyl-pyrrol-1'-yl)-2-(2'',4''-dichloro-anilino)-2-imidazoline fumarate having a melting point of 164°–165°C.

EXAMPLE 26

1-(Pyrrol-1-yl)-2-(4'-chloro-anilino)-2-imidazoline and its fumarate by method C 9.8 gm (0.03 mol) of 1-amino-2-(4'-chloro-anilino)-2-imidazoline fumarate and 4 gm (0.03 mol) of 2,5-dimethoxytetrahydrofuran were introduced into 80 ml of ethanol, ethereal hydrochloric acid was added to the mixture until everything went into solution, and the solution was refluxed for 4 hours. Thereafter, the solvent was distilled off in vacuo, the residue was dissolved in water, and the aqueous solution was fractionally extracted with ether at gradually increasing pH-values. The extract fractions obtained at pH 8 and 9, which contained the free base 1-(pyrrol-1-yl)-2-(4'-chloro-anilino)-2-imidazoline, were combined, admixed with ethanolic fumaric acid, and gasoline was added to the mixed solution. The precipitate formed thereby was collected and recrystallized twice from acetone, yielding 1.2 gm (14.5% of theory) of the fumarate of the formula

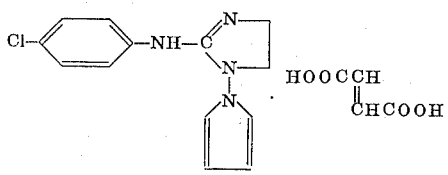

which had a melting point of 182°C.

The compounds of the present invention, that is, those embraced by formula I and their non-toxic, pharmacologically acceptable acid addition salts, have useful pharmacodynamic properties. More particularly, they exhibit hypotensive activity in warm-blooded animals, such as dogs, cats and rabbits.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective hypotensive dosage unit of the compounds according to the present invention is from 0.0016 to 1.34 mgm/kg body weight, preferably 0.016 to 0.5 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 27

Tablets

The tablet composition is compounded from the following ingredients:

| | | |
|---|---|---|
| 1-(2-Imidazolin-2-yl)-2-[2',6'-dichloro-phenyl]-amino]-2-imidazoline | 15 | parts |
| Lactose | 25 | do. |
| Corn starch | 30 | do. |
| Colloidal silicic acid | 3 | do. |
| Magnesium stearate | 2 | do. |
| Total | 75 | parts |

Preparation:

The imidazoline compound is intimately admixed with the lactose and the colloidal silicic acid, the mixture is kneaded with an aqueous paste of the corn starch, the moist mass is granulated by forcing it through a fine-mesh screen, the granulate is dried and admixed with the magnesium stearate, and the composition is compressed into 75 mgm-tablets in a conventional tablet making machine. Each tablet contains 15 mgm of the imidazoline compound and is an oral dosage unit composition with effective hypotensive action.

EXAMPLE 28

Coated pills

The pill core composition is compounded from the following ingredients:

| | | |
|---|---|---|
| 1-(1,4,5,6-Tetrahydro-pyrimidin-2-yl)-2-[(2',6'-dichloro-phenyl)-amino]-2-imidazoline | 15 | parts |
| Lactose | 33 | do. |
| Corn starch | 30 | do. |
| Colloidal silicic acid | 1 | do. |
| Magnesium stearate | 1 | do. |
| Total | 70 | parts |

Preparation:

The ingredients are compounded in the same manner as in the preceding example, and the composition is compressed into 70 mgm-pill cores, which are subsequently coated with a thin shell consisting essentially of a mixture of sugar, talcum and gum arabic, and finally polished with beeswax. Each coated pill contains 70 mgm of the imidazoline compound and is an oral dosage unit composition with effective hypotensive action.

EXAMPLE 29

Hypodermic solution

The solution is compounded from the following ingredients:

| | | | |
|---|---|---|---|
| 1-(2-Imidazolin-2-yl)-2-[(2',6'-dichloro-phenyl)-amino]-2-imidazoline | | 2 | parts |
| Sodium chloride | | 18 | do. |
| Distilled water | q.s.ad | 5000 | do. |
| | | | by vol. |

Preparation:

The imidazoline compound and the sodium chloride are successively dissolved in the distilled water, the solution is filtered until free from suspended particles, and the filtrate is filled into 5 ml-ampules in an atmosphere of nitrogen under sterile conditions. Each ampule contains 2 mgm of the imidazoline compound and the contents thereof are an injectable dosage unit composition with effective hypotensive action.

EXAMPLE 30

Gelatin capsules

The capsule filler composition is compounded from the following ingredients:

| | | |
|---|---|---|
| N-(2,6-Dichloro-phenyl)-N-(4',6'-dimethyl-pyrimidin-2'-yl)-N-(2-imidazolin-2-yl)-amine hydrochloride | 25 | parts |
| Corn starch | 175 | do. |
| Total | 200 | parts |

Preparation:

The ingredients are intimately admixed with each other, and 200 mgm-portions of the mixture are filled

EXAMPLE 31

Suppositories

The suppository composition is compounded from the following ingredients:

| | | |
|---|---|---|
| N-(2,6-Dichloro-phenyl)-N-(2',4'-dimethyl-pyrimidin-6'-yl)-N-(2-imidazolin-2-yl)-amine fumarate | 5 | parts |
| Lactose | 195 | do. |
| Suppository base (e.g. cocoa butter)q.s.ad | 1700 | do. |

Preparation:

The imidazoline compound and the lactose are intimately admixed with each other, the mixture is blended into the molten suppository base with an immersion homogenizer, and 1,700 mgm-portions of the composition are poured into cooled suppository molds and allowed to harden therein. Each suppository contains 5 mgm of the amine salt and is a rectal dosage unit composition with effective hypotensive action.

Analogous results are obtained when any one of the other compounds embraced by formula I or a non-toxic acid addition salt thereof is substituted for the particular active ingredient in Examples 27 through 31. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

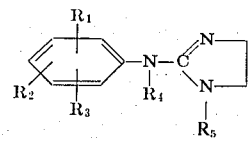

wherein $R_1$, $R_2$ and $R_3$ are each hydrogen, fluorine, chlorine, bromine, methyl, ethyl, ethoxy, trifluoromethyl or cyano, and $R_4$ and $R_5$, which must be different, are hydrogen or

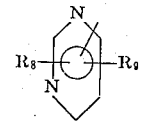

where $R_8$ and $R_9$ are each hydrogen, halogen, methyl or nitro, or a non-toxic, pharmacologically acceptable acid addition salt thereof.

2. A compound of claim 1, which is 1-(1,4,5,6-tetrahydro-pyrimidin-2-yl)-2-[(2',6'-dichloro-phenyl)-amino]-2-imidazoline or a non-toxic, pharmacologically acceptable acid addition salt thereof.

3. A compound of claim 1, which is N-(2,6-dichloro-phenyl)-N-(4',6'-dimethyl-pyrimidin-2'-yl)-N-(2-imidazolin-2-yl)-amine or a non-toxic, pharmacologically acceptable acid addition salt thereof.

4. A compound of claim 1, which is N-(2,6-dichloro-phenyl)-N-(2',4'-dimethyl-pyrimidin-6'-yl)-N-(2-imidazolin-2-yl)-amine or a non-toxic, pharmacologically acceptable acid addition salt thereof.

* * * * *